INVENTOR.
K. E. LYMAN.
BY
ATTORNEY.

Aug. 11, 1931.  K. E. LYMAN  1,818,564
POWER TRANSMISSION
Filed Dec. 28, 1928    4 Sheets-Sheet 3

INVENTOR.
K. E. LYMAN.
BY
ATTORNEY.

Aug. 11, 1931.     K. E. LYMAN     1,818,564
POWER TRANSMISSION
Filed Dec. 28, 1928     4 Sheets-Sheet 4

INVENTOR.
K. E. LYMAN.
BY
ATTORNEY.

Patented Aug. 11, 1931

1,818,564

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

POWER TRANSMISSION

Application filed December 28, 1928. Serial No. 328,951.

My present invention relates in general to power transmissions and has particular reference to an improved speed changing mechanism for transmitting a variable drive from a driving element to an element to be driven.

For the purpose of illustrating the invention and explaining the construction and operation thereof, I have elected to show a form which lends itself unusually well as a speed changing mechanism for motor vehicles. I wish it to be understood, however, that the invention is not necessarily limited to this particular use as it may well find expression in a speed changing mechanism for other power transmissions wherein it is desirable to effect a variable driving ratio between two elements such as a driving shaft and a driven shaft.

One important object of the invention is to provide a mechanism of the above described character which will function automatically to change the driving ratio between a driving element and an element to be driven.

Another important object of the invention is to provide a mechanism as above described which may be produced commercially in competition with present day motor vehicle transmissions so that the same may be substituted therefore and as a result improve the construction and operation of motor vehicles not only by eliminating the manual manipulation of the speed changing mechanism but also by accomplishing a much wider range of practical operation than has been heretofore possible with known types of transmissions.

It will be thus observed that I have developed a power transmission which is not only an improvement on account of its automatic operation but also an improvement in another sense, in that aside from the automatic operation, it is more efficient from an economical fuel consumption view point, quietness in operation, the absence of difficult parts to manufacture and in this connection attention is called to the few parts required to make up the assembly. Aside from all these advantageous features, it is capable of establishing between the driving and driven elements a wide range of variable ratios of power transmission which will automatically change in conformity with operating conditions for which the ordinary speed changing mechanism is incapable of accounting.

Other objects of the invention will appear hereinafter, the novel features and combinations being set forth in the subjoined claims.

One embodiment of the invention is presented herein for the purpose of illustration but it will of course be understood that the invention is susceptible to other different modified embodiments which come equally within the scope of the appended claims.

In the accompanying drawings:—

Figure 1:
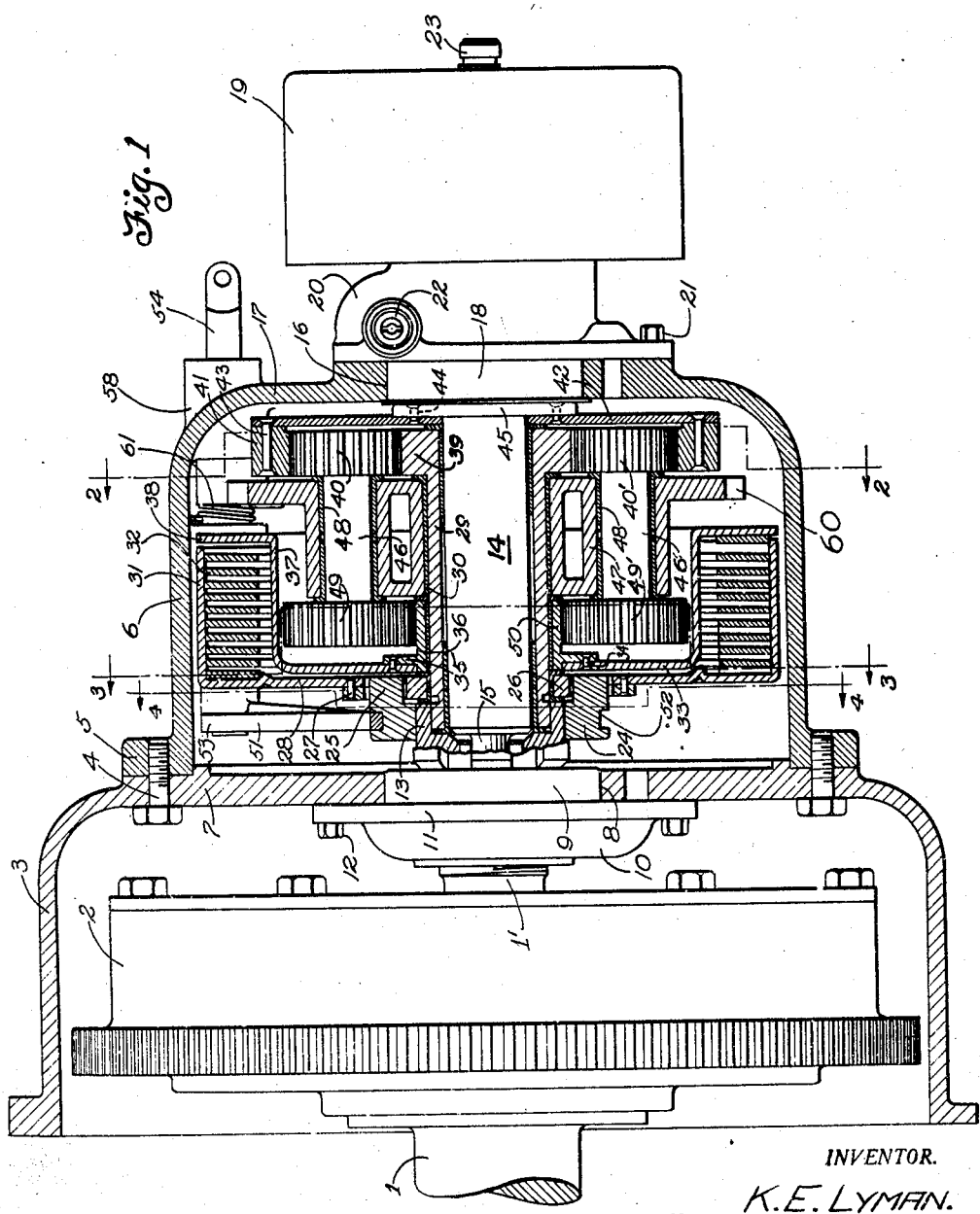
Fig. 1 is a longitudinal section of a transmission constructed in accordance with my invention.

Referring now to the drawings in detail and according to the embodiment of the invention selected for illustration: 1 represents a motor shaft which is mounted in driving relation with the flywheel part of a combined flywheel and clutch 2. The clutch 2 is inclosed within a bell housing 3 and may be employed as an instrumentality for interrupting the drive between the speed changing mechanism and the prime mover. Any clutch suitable for the purpose may be employed in the present combination. It may be a manual operable clutch of standard construction such as employed in well known makes of automobiles or it may be an automatic clutch such as illustrated in my co-pending application, Serial No. 317,156.

The bell-housing 3 extends rearwardly as illustrated and is connected by means of bolts 4 or other means suitable for the purpose to a flange 5 of the transmission case 6. The bell-housing is made with a closed end wall 7 which separates the bell-housing from the transmission case 6 and also serves as an end closure for the transmission case. Centrally formed in the end wall 7 of the bell-housing is an opening 8 which supports an anti-friction bearing 9 in which the clutch shaft 1' is journaled. For the purpose of the present description it may be considered that the clutch shaft 1' is a driving element. Since the transmission case 6 will ordinarily contain a quantity of lubricant it becomes necessary to seal the same to retain the lubricant. For this reason an oil retainer 10 is mounted on the clutch shaft 1' around the anti-friction bearing 9 and the flange 11 of the retainer is bolted or otherwise secured as at 12 to the end wall 7 of the bell-housing on the outside of the transmission case. The clutch shaft 1' preferably terminates at the end wall 7 of the bell-housing 3, except that it is made with a rearwardly presented sleeved fitting 13 which extends into the transmission case to receive the driven shaft 14 otherwise referred to as the driven element. The driven shaft 14 is provided with a pilot 15 which is accommodated in an axial bore in the clutch shaft 1' so that the driven shaft may be properly supported with freedom of rotation relative to the clutch shaft.

The driven shaft 14 is supported in an opening 16 in the end wall 17 of the transmission case by means of an anti-friction bearing 18. Here again the transmission case is properly sealed against the escape of the lubricant contained therein. Fixed to rotate with the driven shaft and mounted rearwardly of the transmission case is a brake drum 19 which contributes to a hand operated parking or emergency brake. The drum 19 being formed with a bracket 20 which is bolted or otherwise secured to the transmission case as at 21. Provided also in this bracket 20 is a speedometer take-off 22. The universal joint-equipped propeller shaft is adapted to be connected with the driven shaft as at 23.

Slidably mounted on the outer circumference of the sleeved fitting 13 is an axially shiftable clutching dog 24. The projecting lugs 25 of this clutching device are adapted to be moved into and out of engagement with openings, slots or the like formed in a ring member 26 which is riveted, bolted, or otherwise secured as at 27 to a radial plate 28. The ring member 26 in this connection is journaled on a sun gear sleeve 29 with an intervening bushing 30. The sun gear sleeve 29 will be more specifically hereinafter referred to. The radial plate 28 is formed with a rearwardly presented circular band 31 which forms one companion part of a housing for the control spring 32. The other companion part of this spring housing comprises a plate 33 which is riveted or otherwise secured as at 34 to a flange 35 on the sun gear sleeve 36. This sun gear sleeve will be hereinafter more particularly referred to. The plate 33 like the plate 28 is made with a rearwardly presented circular band 37 concentrically arranged relatively of the band 31 and the extremity of the band 37 is bent outwardly to overlap the edge of the band 31 to provide an end closure 38 for the spring housing. One end of the spring 32 is connected or anchored to the plate 28 as at 28' and the opposite end of the spring is similarly connected or anchored to the end closure 38 on the plate 33.

Figure 4:
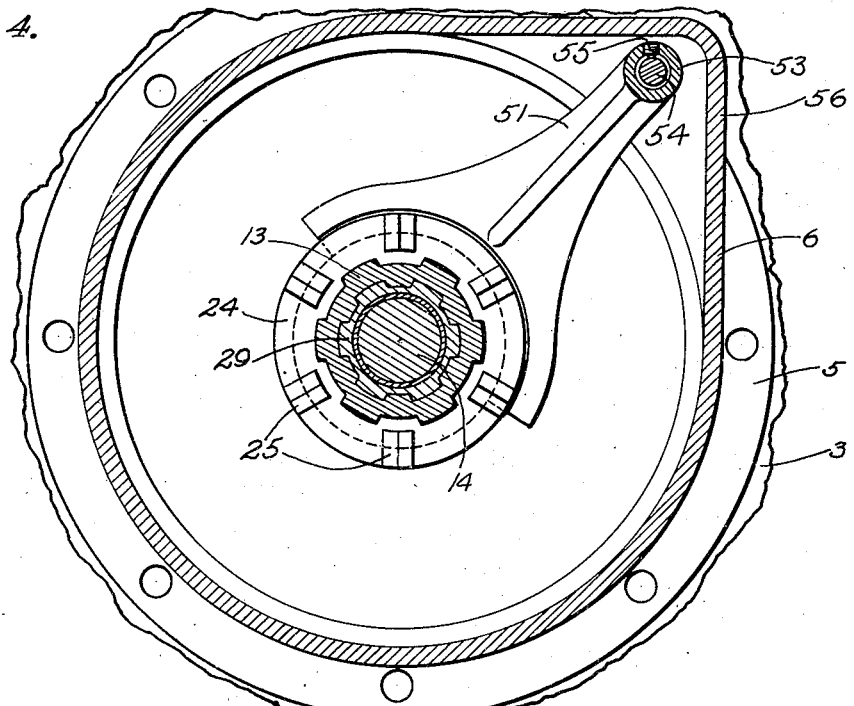
Fig. 4 is a view in cross section on the line 4—4, Fig. 1.

As will be readily seen from the illustration in Fig. 1 when the clutching dog 24 is in the position shown the plate 28 is connected in driving relation with the driving shaft whereas the plate 33 is connected in driving relation with the driving shaft through the sun gear sleeve 36 and the gearing connected therewith. Referring now to the sun gear sleeve 29 in Fig. 4, it will be seen that this sleeve is splined on the inside of the sleeved fitting 13 and that the sleeved fitting 13 is splined on the outside for the clutching dog 24. The sleeve 29 in Fig. 1 extends rearwardly and terminates in an integral sun gear 39 and meshing therewith is a planet gear 40. The planet gear 40 is also in constant mesh with a ring gear 41 which is fixed in driving relation with the driven shaft 14 by a plate 42 which is riveted or otherwise fixed to the ring gear 41 as at 43 and riveted or otherwise fixed as at 44 to a flange 45 on the driven shaft. It will thus be seen that the sun gear 39 is in fixed driving relation with the driving shaft. Although the planet gear 40 is in constant mesh with the sun gear and ring gear, the drive from the driving shaft to the driven shaft will only be established at forward speeds when the clutching dog is engaging the plate 38. This detail of operation of the mechanism will be more specifically referred to in a later part of the description. The planet gear 40 is splined or otherwise fixed on a planet shaft 46. This shaft is journaled in a planet carrier or spider 47 with intervening bushings 48 and mounted on the end opposite of the planet shaft 46 is a planet gear 49. The planet gear 49 is splined or otherwise fixed on the planet shaft and is coaxially mounted relatively to the planet gear 40. The planet gear 49 is in constant mesh with a sun gear 50 on the sun gear sleeve 36 and is therefore connected in fixed driving relation with the plate 33. The spider or planet carrier 47 floats between the planet gears 40 and 49 at forward speeds and is journaled with freedom of rotation relatively to the sun gear sleeve 29. Thus, the forward motion of the spider 47 is controlled by the gear ratios between the sun gears 39 and 50.

In the foregoing description no mention has been made of the companion planet gears 40' and 49' which are diametrically opposed to the gears 40 and 49. These companion planet gears are of importance only in balancing the mechanism and they perform no function that is not performed by the gears 40 and 49, except that as stated, they balance the mechanism and provide a more practical construction than if they were eliminated. It is of course understood that the gear 40' is in constant mesh with the ring gear 41 and the sun gear 39 and that the gear 49' is in constant mesh with the sun gear 50. The planet shaft 46' on which the gears 40' and 49' are splined is journaled in the spider or planet carrier 47, as is the planet shaft 46.

The clutching dog 24 is axially shifted by means of a manual manipulated fork 51. The curved segment on the fork is seated in an annular groove 52 in the circumference of the clutching dog. The opposite end of the fork is made with a collar 53 which is fixed on a shifting rod 54 by means of a set screw 55 or other suitable means. The rod 54 is accommodated within an off-set corner 56 on the transmission case and it extends rearwardly of the case with web portions 57 supporting the same. It extends through the case and is further supported by a boss 58 on the outside of the case as best illustrated in Fig. 1. Any suitable manually operable lever arrangement may be secured to the end of the rod for actuating the same from the driver's seat of the motor vehicle. Operation of the rod 54 not only positions the clutching dog 24 but it also controls the pawl 59 which is fixed on the rod 54 within the transmission case and is adapted to be moved into engagement with the ratchet teeth 60 on the spider 47.

For forward speeds the clutching dog is positioned as shown in Fig. 1, that is, in engagement with the plate 28 of the spring housing. For forward speeds the pawl 59 is retained out of engagement with the ratchet teeth 60 on the spider by means of a spring 61 which is coiled around the rod 54. The coiled end of this spring bears against the inside of the top of the transmission case and the opposite end is anchored in an opening 62 in the pawl. The spring is wound so as to retain the pawl 59 normally out of engagement with the spider 47. When it is desired to reverse the drive, the rod 24 is shifted forwardly to disengage the clutching dog 54 from the plate 28, then by turning the rod the pawl 59 may be brought into engagement with the ratchet teeth 60 against resistance of the spring 61 and the spider will be thus held against rotation in an anti-clockwise direction viewed from Fig. 2. In other words, for reversing purposes the drive is taken in on the sun gear 39 as in forward speeds but the spider 47 is held against rotation. The ring gear 41 will be driven in a reverse direction which will of course reverse the driven shaft.

Figure 5:
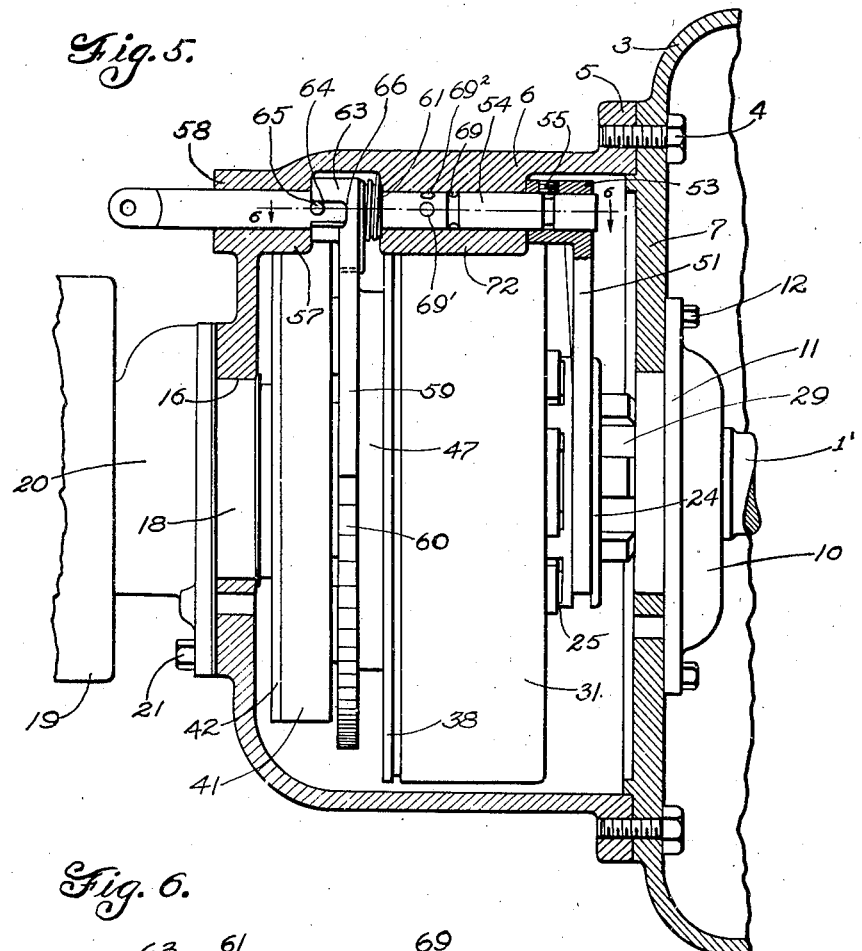
Fig. 5 is a view in section taken on the line 5—5, Fig. 2.

As best illustrated in Fig. 5, the pawl 59 is mounted on the rod 54 by a collar 63 and the collar is formed with a slot 64 in which the pin 65 on the rod 54 is free to slide. When the rod 54 is shifted forwardly to disengage the clutching dog 24 and when it has been shifted far enough to completely disengage the clutching dog, the pin 65 will be positioned in the closed end 66 of the slot 64 so that when the rod is then turned, the pawl will be rocked into engagement with the ratchet teeth 60. To prevent rotation of the rod 54 while the clutch is engaged, a stop 67 is positioned adjacent the pin 65 and immediately beneath the same. When the rod 54 has been shifted far enough to disengage the clutch, the pin 65 will have cleared the stop 67 and the rod will thus be released for turning movement.

Figure 6:
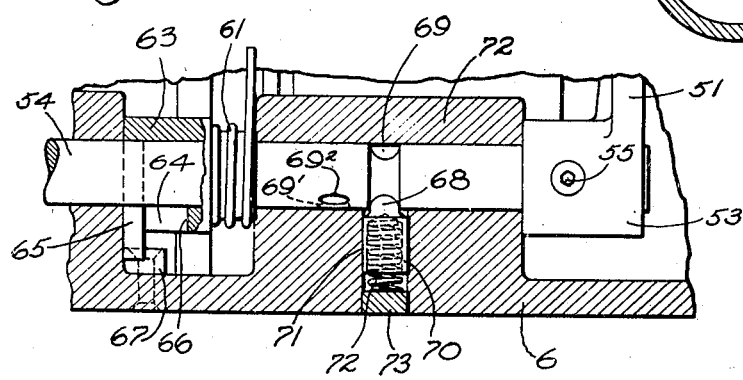
Fig. 6 is a detailed view of a section taken on the line 6—6, Fig. 5.

In other words, as the pin 65 clears the stop 67, it becomes positioned in the closed end 66 of the slot 64 whereupon rotation of the rod will move the pawl into engagement with the ratchet teeth as previously described. By means of this stop 66 there will be no possibility of arresting the rotation of the spider until the clutch has been thrown out. When the clutch is in, it will be yieldably held under the influence of a round headed spring pressed plunger 68 seated in an annular groove 69 in the rod 54. The round headed plunger 68 is formed on the end of a cylinder 70 which is accommodated in an opening 71 in the transmission case 6 and the spring 72 is confined in the cylinder 70 with its end bearing against a block 73 which closes the opening 71 from the outside of the case. When the rod 54 has been shifted to disengage the clutch, the annular groove 69 will have been moved to the right viewed from Fig. 6 and the depression 69' will be moved into registry with the round headed plunger 68. This is the neutral position of the rod and it is yieldably held in this position. When the rod 54 is turned to move the pawl into engagement with the ratchet teeth for reversing, the depression $69^2$ will be brought into registry with the round headed plunger 68 and the plunger will occupy the same and thus yieldably hold the rod against turning backwards. The purpose of this yieldable restraint on the rod is to overcome the influence of the spring 61. In other words, the pawl is moved into engagement with the ratchet teeth against the resistance of the spring 61 and it is possible that the spring 61 would return the rod were it not for the yielding action of the round headed plunger which is sufficient to overcome the influence of the spring 61.

Figure 7:
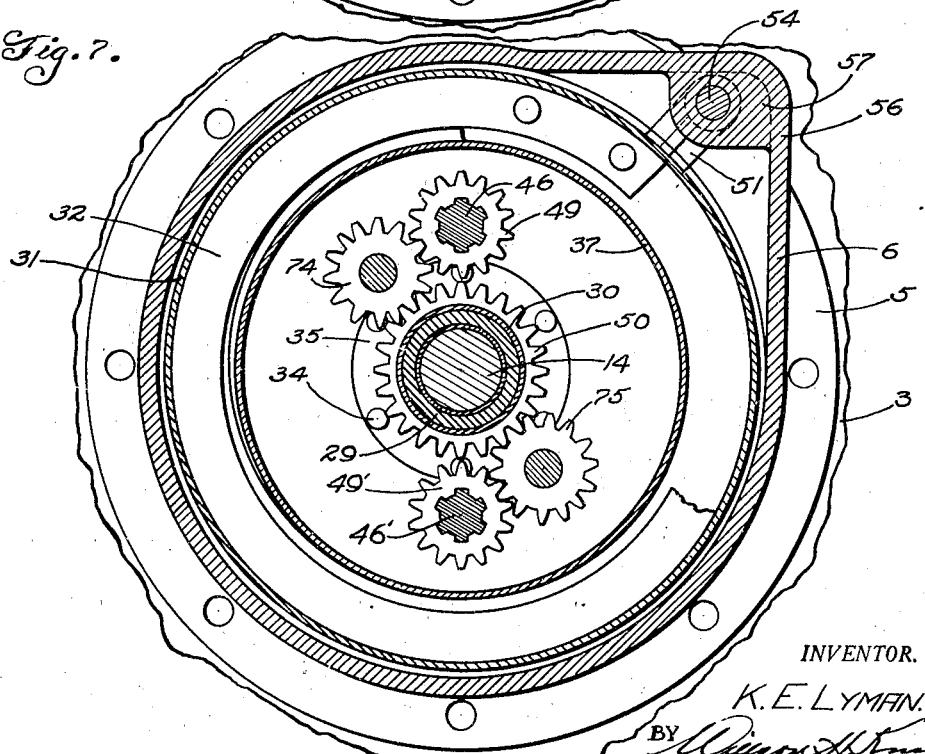
Fig. 7 is a view in cross section similar to Fig. 3 but showing a slightly modified form.

In the modified embodiment illustrated in Fig. 7, I have shown how it would be possible to use an extra set of plant gears 74 and 75. As will be fully explained when describing the operation of the mechanism in the preferred construction, the two plates 28 and 33 of the housing for the spring 31 rotate in the same direction, by using an extra pair of planet gears such as 74 and 75 and meshing the same with the sun gear 50 and the two planet gears 49 and 49'; the plate 33 of the spring housing will be caused to rotate in an opposite direction to that of the rotation of the plate 28. Of course, it is understood that in such an arrangement, the planet gears 49 and 49' will not be in mesh with the sun gear 50. With this modified embodiment the spring 32 will be wound up much quicker than it would be if the plates 28 and 33 were both driven in the same direction. It is of course understood that when the plates are driven in the same direction, the plate 33 rotates faster than the plate 28 which action winds the spring up. It might be also pointed out here that in this modified embodiment only one set of planet gears 49 and 74 or 75 and 49' are required, except the addition of the duplicate set balances the mechanism and is a more practical construction.

In analyzing the construction and cooperative relationship of parts of the mechanism, it will be seen that I have devised a transmission which embodies in its construction planetary gearing for connecting the driving and driven elements in different speed ratios. The planetary gearing in this respect comprises the sun gear 39, the planet gear 40 or the planet gears 40 and 40' and the ring gear 41. The planet gear 40 or the planet gears 40 and 40' comprising a planetating power transmitting element or elements in the planetary gearing. In addition to this planetary gearing I have also provided means for automatically changing the ratio, comprising a resiliently restrained gear train comprising the planet gear 49 or the planet gears 49 and 49' and the sun gear 50. In the modified embodiment shown in Fig. 7 this resiliently restrained gear train is made up of the sun gear 50 and the planet gears 49, 49', 74 and 75. The resilient restraint on the gear train is realized by the spring 32.

The cooperative relationship of the parts in the assembly causes the gear train to yieldably influence the rotation of the planetating power transmitting element such as the planet gear 40 about its own axis and as a result the driving ratio is automatically changed to compensate for the variations in load on the driven shaft.

To more fully explain the operation of the mechanism, it may be explained that a transmission constructed in accordance with my invention will automatically develop variable forward speeds by torque balance. The sun gear 39 in the primary system of the mechanism is always fixed in driving relation with the driving shaft. Thus, the primary system is connected with the driving shaft but since the planet gear 49 is fixed on the planet shaft 46 which is also true of the planet gear 40, the secondary system is also connected in driving relation with the driving shaft and this is also true of the plate 33 to which one end of the spring 32 is anchored. When the clutching dog 24 is engaged with the plate 28 as it will be for forward speeds, the plate 28 to which the opposite ends of the spring 32 is anchored is also connected with the driving shaft.

Figure 2:
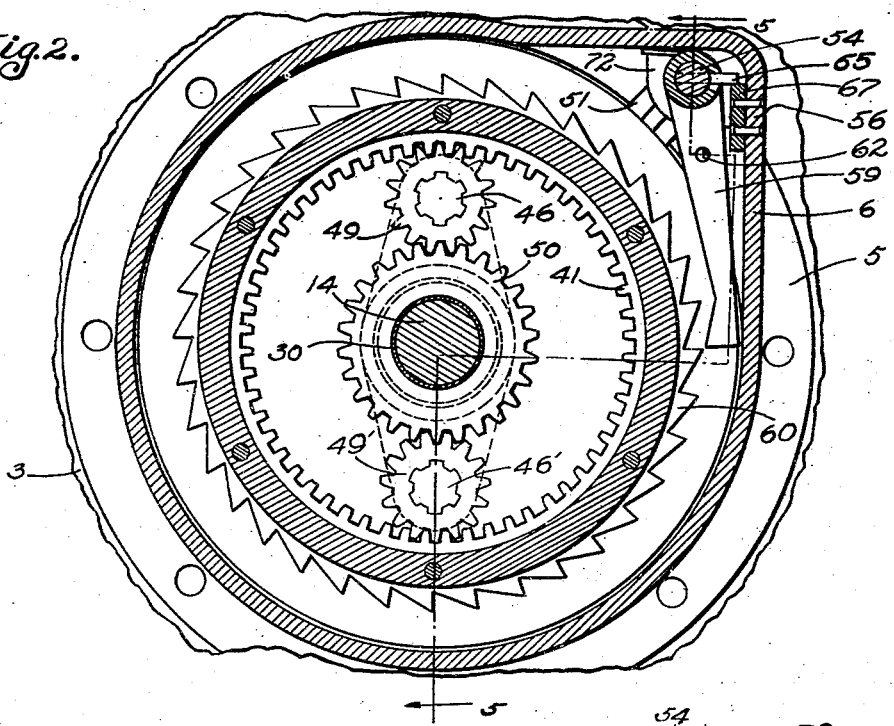
Fig. 2 is a view in cross section on the line 2—2, Fig. 1.
Figure 3:
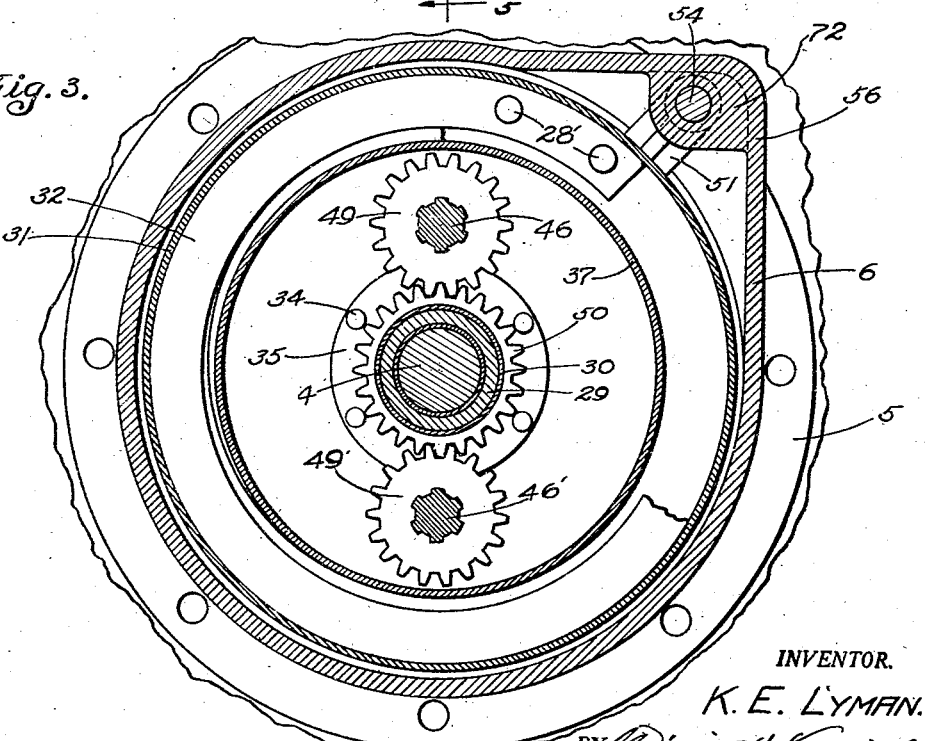
Fig. 3 is a view in cross section on the line 3—3, Fig. 1.

When torque is applied to the driving shaft, a turning movement is applied to the planet gears 40 and 49 in a clockwise direction viewed from Fig. 2. This winds up the spring 32 and makes the resiliently restrained sun gear 50 run ahead of the sun gear 39. The planet spider of course will be turning in a clockwise direction viewed from Fig. 2 and the tension of the spring 32 is exerted through the planet gears. This tension operates through the planet gear 40 which meshes with the sun gear 39, which is a fulcrum for the planet gear, causing a clockwise rotation, viewed from Fig. 2, of the ring gear 41. As the gear ratio is a function of the internal ring gear system planetation, the differential motion of the spider carrying the planet gears is a function of the degree of flexing of the spring. In operation the driving torque causes the sun gear 50 to run ahead and at the same time the action tends to cause relative retrograde action of the spider.

When the torque required to drive the driven shaft approaches the driving torque, the spring unwinds which causes an acceleration of the spider in an anti-clockwise direction viewed from Fig. 2 which in turn accelerates the ring gear, but in as much as the sun gear 39 rotates at a substantially constant rate, a substantially one to one drive is approached. This continues until substantially equal torques reduce the system to a unit drive. Torque unbalancing of the drive and driven shafts will result in such changes in gear ratio as is determined by the degree of resiliency of the spring.

Describing the action in another way, it could be stated that the resiliently restrained gear for yieldably influencing the rotation of the gear 40 about its own axis varies the tooth pressure between the gear 40 and the ring gear and of course the sun gear 39, and as a result changes the rate of rotation of the driven shaft.

Describing the operation in still another way, there are in reality three differential systems in the construction illustrated. The first consists of gears 50, 49, 40 and 39. When gears 50 and 39 are rotated at the same speed, the differences of gear ratios of the gears 50 and 39 causes gears 49 and 40 to planetate at a fixed ratio. In the second system are gears 39, 40 and 41. When gear 39 is rotated and the gear 41, which is the load carrying member, is stationary the gear 40 will planetate at a predetermined speed. If gear 41 is rotated, in a forward direction, the planetation of the gear 40 will be a mathematical function of the rotation of the gears 39 and 41. The third system is the combination of systems one and two and the differential action developed thereby. Thus, it may be noted, that in a forward drive position of the transmission, the gear 40 being connected to the gear 39 through the resilient member 32 and the gear 41 will be rotated forward by reason of differential action between differential systems one and two through and as determined by the degree of flexing of the resilient member 32.

The spring which I prefer to use for the resilient restraining member is so constructed as to possess the maximum resiliency and strength for its weight and size. The mounting is such as to place no internal strains in operating under any degree of flexing.

The novel way of mounting the spring 32 should be given due consideration and in this connection, it should be noted that the circular band 31 limits unwinding the spring and the band 37 limits the extent to which it may be wound up. It is therefore held and limited in its winding and unwinding action.

It is interesting to note that the mechanism requires only seven gears and a minimum number of other parts. It will therefore be unusually economical to manufacture not only compared to heretofore suggested types of automatic transmissions but also compared to conventional types of transmissions employed in the present day motor vehicle.

Having thus described and shown an embodiment of my invention, what I claim and desire to secure by Letters Patent of the United States is:

1. In an automatic transmission, driving and driven elements, change speed gearing for connecting said elements and means for automatically changing the driving speed, comprising in combination, a drive transmitting gear mounted for planetating movement and through which the drive is transmitted from the driving element to the driven element, torque responsive resilient restraining means for influencing the rotation of said drive transmitting gear and a differential gear system connecting said resilient restraining means with said drive transmitting gear.

2. In an automatic transmission, driving and driven elements, a spring restrained plural differential gear system connecting said elements, a drive transmitting planet gear functioning as an element in said gear system and through which the drive is transmitted from the driving element to the driven element, a planet shaft on which said planet gear is mounted, a floating carrier for said shaft and means for holding said carrier against rotation for reversing the drive.

3. In an automatic transmission, driving and driven shafts, speed changing gearing for connecting said shafts and means for automatically changing the driving speed, comprising in combination, a spring restrained plural differential gear system, means for yieldingly connecting certain of the elements in said system with the driving shaft, means for connecting said system with the driven shaft, a gear functioning as an element in said gear system and through which the drive is imparted to the driven shaft from the elements connected with the driving shaft.

4. In a transmission, driving and driven elements, speed changing mechanism for connecting said elements in variable driving ratios, a sun gear and ring gear in said mechanism, means for connecting said sun gear with the driving element, means for connecting said ring gear with the driven element, a planet gear meshing with said sun gear and said ring gear and means for automatically changing the driving ratio, comprising a resiliently restrained sun gear coaxially mounted relatively to said first named sun gear, a planet gear meshing with said resiliently restrained sun gear and mounted in fixed coaxial relation with said first named planet gear.

5. In a transmission, driving and driven elements, planetary change speed mechanism for connecting said elements in variable driving ratios, a planetating drive transmitting member in said mechanism through which the drive is imparted from the driving element to the driven element and means for automatically changing the driving ratio in said mechanism, comprising a differential gear system in which said planetating drive transmitting gear functions as an element, a planet gear in said differential gear system synchronized with said planetating drive transmitting gear and a spring device having one end mounted for winding movement through said planet gear in the differential gear system and the other end mounted for winding movement by the driving element.

6. In a transmission, driving and driven elements, speed changing mechanism for connecting said elements in variable driving ratios, a sun gear in said mechanism, means for connecting said sun gear with the driving shaft, a ring gear, means for connecting said ring gear in driving relation with the driven shaft, a primary planet gear meshing with said sun gear and said ring gear, a planet shaft for said planet gear, a planet carrier in which said shaft is journaled, a second planet gear mounted on said planet shaft, a secondary sun gear with which said secondary planet gear meshes, a spring coiled to yieldably influence the rotation of said primary planet gear about its own axis and a mounting for connecting one end of the spring with the driving shaft and the other end with said secondary sun gear.

7. In a transmission, a shaft adapted for connection with a prime mover, a clutch shaft, a clutching mechanism connecting said shafts, a housing for said clutching mechanism, a transmission case mounted on said housing, a driven shaft extending into said transmission case coaxially of said clutch shaft and mounted for rotation relatively of the clutch shaft, a two part mounting for a coiled spring in said transmission case, means for connecting one part of said mounting with the clutch shaft, a gear journaled on the driven shaft, means for connecting the other part of said spring mounting in driving relation with said gear, a planet gear meshing with said gear, a shaft for said planet gear, a planet carrier journaled on said driven shaft and in which said planet shaft is journaled, said carrier being mounted with freedom of rotation when the driven shaft is driven in one direction, means for holding said carrier against rotation and means for disconnecting the drive between the clutch shaft and one part of the spring mounting for reversing the direction of drive of the driven shaft, a power transmitting planet gear mounted on said planet shaft coaxial with said first named planet gear and spaced therefrom by said planet carrier, said power transmitting planet gear functioning as an element in a primary gear system and means for connecting one element of said system with the clutch shaft and another element of said system with the driven shaft.

8. In a transmission, a driving shaft, a clutching device having a part with which the driving shaft is connected, a clutch shaft connected with another part of the clutching device, a driven shaft mounted coaxially with the clutch shaft and for rotation relatively thereof, a sun gear journaled on the driven shaft, means for connecting said sun gear in driving relation with the clutch shaft, a ring gear, means for connecting said ring gear in driving relation with the driven shaft, a planet shaft, a primary planet gear mounted on one end of said planet shaft and meshing with said sun gear and said ring gear, a secondary planet gear mounted on the opposite end of said planet shaft, a planet carrier for said planet shaft mounted to float at forward drives between the primary and secondary planet gears, a secondary sun gear with which said secondary planet gear meshes, a coiled spring, a two-part mounting for said spring, means for connecting one end of the spring with one part of said mounting and means for connecting the other part of said mounting with the opposite end of the spring, means for connecting one part of said mounting to the secondary sun gear, means for releasably connecting the other part of said mounting to the clutch shaft and means for reversing the drive in said mechanism, comprising a clutch for disconnecting the clutch shaft with the spring mounting and means for holding the planet carrier against rotation.

9. In a transmission, driving and driven elements, speed changing mechanism for connecting said elements in variable driving ratios, a driving gear and driven gear in said mechanism, means for connecting said driving gear with the driving element, means for connecting said driven gear with the driven element, a planet gear meshing with said driving gear and said driven gear and through which the drive is imparted from the driving element to the driven element and means for automatically changing the driving ratio, comprising a resiliently restrained gear coaxially mounted relative to said driving gear, a planet gear meshing with said resiliently restrained gear and mounted in fixed coaxial relation with said first named planet gear.

10. In a transmission, a power moved driving element, a load moving driven element, means for connecting said elements in variable driving ratios and means for automatically changing the ratio, comprising in combination, a planetary gear train, a planet gear in said gear train through which the drive is imparted from the driving element to the driven element and a torque balanced device for changing the rate of planetation of said planet gear and compensating for the load resistance on said driven element, comprising a secondary gear train, means for connecting one of the gears in said secondary gear train coaxially with said planet gear for movement therewith, a spring device, means for connecting one end of the spring device for winding action with another gear in said secondary gear train which moves in the same direction as the driving element but relative thereto and means for connecting the opposite end of said spring device with the driving element for winding action.

11. In a transmission, a power moved driving element, a load moving driven element, means for connecting said elements in variable driving ratios and means for automatically changing the ratio, comprising in combination, a planetary gear train, a planet gear in said gear train through which the drive is imparted from the driving element to the driven element and a torque balanced device for changing the rate of planetation of said planet gear and compensating for the load resistance on said driven element; said device comprising a spring mechanism, means for connecting one end of the spring mechanism with the driving element for winding action, means for connecting the opposite end of the spring mechanism with said planet gear for winding action in the same direction as the opposite end but at a different rate of angular movement relative to the opposite end.

Signed at Rockford, in the county of Winnebago and State of Illinois, this 26th day of December, 1928.

KENNETH E. LYMAN.